Patented Mar. 11, 1941

2,234,920

UNITED STATES PATENT OFFICE 2,234,920

CERAMIC COLOR

William D. Stillwell, South Euclid, Ohio, assignor to The Harshaw Chemical Company, Elyria, Ohio, a corporation of Ohio Application March 15, 1939, Serial No. 262,075

7 Claims. (Cl. 106—36.2)

This invention relates to ceramic colors and particularly to the enhancement of the strength of chrome-tin colors by the incorporation of copper therein.

It is well known that a calcine of tin oxide and chromium oxide yields a lilac to crimson color, depending upon calcination temperature, proportions and other oxides present ($Al_2O_3$, CaO, $SiO_2$, $CaF_2$, china clay, etc.). These colors have been long used, particularly the pinks as substitutes for the expensive gold pinks. Notwithstanding their long use, these colors are, as is well known, not fully satisfactory, particularly as to strength.

I have now discovered a series of chrome-tin-copper colors which have excellent strength in addition to desirable color characteristics of the chrome-tin colors.

In the practice of the invention, I calcine suitable mixtures of the oxides of tin, chromium and copper, or materials capable of yielding such oxides on calcination with or without other oxides, such as CaO, $SiO_2$, etc. The mixture preferably is prepared by dry ball milling the ingredients together although wet ball milling gives good results. The calcination is carried out at temperatures of 1300° C. to 1500° C. in either neutral or oxidizing atmosphere. The proportions depend upon the color desired and the other oxides present. Some of the available colors are especially strong and pleasing while others are of less value. In general, those compositions which tend toward green are to be avoided while the violets and pinks are of outstanding brilliance and strength.

Figure 1:
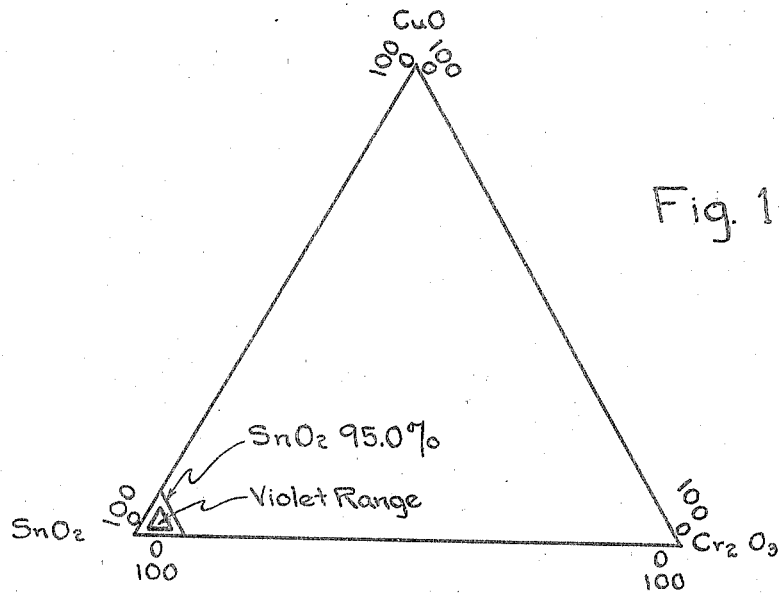
Figure 2:
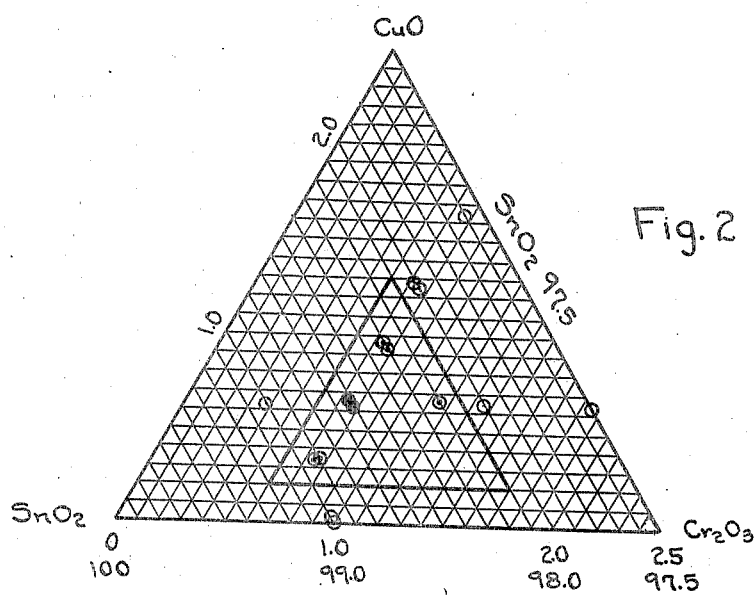

In the accompanying drawing, Fig. 1 is a diagram showing a range of composition of a tin-chromium-copper violet of exceptional strength and brilliancy and Fig. 2 is an enlarged portion of the same diagram showing experimentally determined points used in the location of the effective, critical proportions for the production of the new and superior violet. Best proportions are indicated by black circles, excellent proportions by the heavy triangle and dotted circles therein, and distinctly less desirable proportions by circles, outside the heavy triangle within Fig. 2.

While, as stated above, a series of violet to crimson colors are obtainable by the use of relatively large proportions of tin oxide or tin oxide yielding materials with small proportions of chrome oxides and copper oxides or materials yielding the same, either alone or with other oxides, the violets and pinks are especially desirable and will be used to illustrate the invention.

By way of specific example of the violet colors, the following compositions by weight were ball milled and calcined at 1200° C. and at 1300° C.:

| No. | $SnO_2$ | $CrO_3$ | $Cu(NO_3)_2.3H_2O$ |
|---|---|---|---|
| 1 | 100 | 1.0 | 5.0 |
| 2 | 100 | 1.0 | 4.0 |
| 3 | 100 | 1.0 | 3.0 |
| 4 | 100 | 1.0 | 2.0 |
| 5 | 100 | 1.0 | 1.0 |
| 6 | 100 | 1.0 | 00 |

Converted to the oxides on a percentage basis, by calculation, these correspond to compositions as follows:

| No. | $SnO_2$ | $Cr_2O_3$ | CuO |
|---|---|---|---|
| 1 | 97.6 | .74 | 1.61 |
| 2 | 98.0 | .74 | 1.29 |
| 3 | 98.3 | .75 | .97 |
| 4 | 98.6 | .75 | .65 |
| 5 | 98.9 | .75 | .33 |
| 6 | 99.0 | 1.00 | 0 |

Numbers 3, 4 and 5 gave the desirable violet color. Numbers 1 and 2 are useful colors but not equal to 3, 4 and 5. The above data are graphically represented in Fig. 2.

The following batches were calcined at 1350° C.:

| No. | $SnO_2$ | $CrO_3$ | $Cu(NO_3)_2.3H_2O$ |
|---|---|---|---|
| 7 | 100 | 1.0 | 0.0 |
| 8 | 100 | 1.0 | 1.0 |
| 9 | 100 | 1.0 | 2.0 |
| 10 | 100 | 1.0 | 3.0 |
| 11 | 100 | 1.0 | 4.0 |
| 12 | 100 | 0.4 | 2.0 |
| 13 | 100 | 1.5 | 2.0 |
| 14 | 100 | 2.0 | 2.0 |
| 15 | 100 | 2.5 | 2.0 |

Calculated to the oxides on a 100% basis, these yield the following compositions:

| No. | $SnO_2$ | $Cr_2O_3$ | CuO |
|---|---|---|---|
| 7 | 99.2 | .76 | 00 |
| 8 | 98.9 | .75 | .33 |
| 9 | 98.6 | .75 | .65 |
| 10 | 98.3 | .75 | .98 |
| 11 | 98.0 | .74 | 1.29 |
| 12 | 99.0 | .38 | .65 |
| 13 | 98.2 | 1.12 | .65 |
| 14 | 98.0 | 1.39 | .65 |
| 15 | 97.5 | 1.85 | .65 |

Numbers 8, 9, 10 and 13 are the desirable violet colors. Numbers 11, 12, 14 and 15 are less valuable colors. The above data are graphically represented in Fig. 2.

These violets have been used as glaze and underglaze colors with excellent results. It is to be understood, of course, that it is the color developed in the ultimate product which has been referred to above, the color of the calcination product (powder) being unimportant except insofar as it determines the final color. In Fig. 2, black circles indicate best violet colors, circles with dots indicate excellent violets while empty circles indicate a departure from the highly desirable violet, although they are by no means worthless on that account.

By way of example of the new compositions yielding pink colors of unusual strength, the following batches were calcined at 1400° C., having been first dry ball milled to substantial homogeneity:

| No. | $SnO_2$ | $SiO_2$ | $CaCO_3$ | $PbCrO_4$ | $Cu(NO_3)_2 \cdot 3H_2O$ |
|---|---|---|---|---|---|
| 16 | 41.0 | 23.4 | 30.9 | 4.7 | |
| 17 | 41.0 | 23.4 | 30.9 | 4.7 | 1.7 |
| 18 | 41.0 | 23.4 | 30.9 | 4.7 | 2.6 |
| 19 | 41.0 | 23.4 | 30.9 | 4.7 | 3.5 |
| 20 | 41.0 | 23.4 | 30.9 | 4.7 | 4.3 |
| 21 | 49.2 | 19.5 | 28.4 | 2.9 | |
| 22 | 49.2 | 19.5 | 28.4 | 2.9 | 1.18 |
| 23 | 49.2 | 19.5 | 28.4 | 2.9 | 1.77 |
| 24 | 49.2 | 19.5 | 28.4 | 2.9 | 2.36 |
| 25 | 49.2 | 19.5 | 28.4 | 2.9 | 2.96 |

These being calculated to oxides (neglecting lead oxide because other sources of chromium oxide, such as $CrO_3$, are equivalent) will yield the following parts by weight:

| No. | $SnO_2$ | $SiO_2$ | $CaO$ | $Cr_2O_3$ | $CuO$ |
|---|---|---|---|---|---|
| 16 | 49.6 | 28.3 | 20.9 | 1.3 | |
| 17 | 49.6 | 28.3 | 20.9 | 1.3 | .68 |
| 18 | 49.6 | 28.3 | 20.9 | 1.3 | 1.04 |
| 19 | 49.6 | 28.3 | 20.9 | 1.3 | 1.39 |
| 20 | 49.6 | 28.3 | 20.9 | 1.3 | 1.72 |
| 21 | 57.6 | 22.8 | 18.6 | .8 | |
| 22 | 57.6 | 22.8 | 18.6 | .8 | .46 |
| 23 | 57.6 | 22.8 | 18.6 | .8 | .68 |
| 24 | 57.6 | 22.8 | 18.6 | .8 | .82 |
| 25 | 57.6 | 22.8 | 18.6 | .8 | 1.15 |

Numbers 16 and 21 are blanks or standard batches for chrome-tin pinks and are characteristically lacking in strength. Numbers 17 to 20 and 22 to 25 are decidedly improved in strength and brilliance over 16 and 21. It will be noted that the proportions of chromium oxide and copper oxide with respect to tin oxide may be substantially increased in the case of the pinks over the proportions used in the case of the violets, and with a strengthening of the resulting colors. However, in all cases the percentages of chrome oxide and copper oxide are relatively small as compared to tin oxide. Chrome and copper oxides may be used up to from five to ten per cent of the tin oxide. The preferred range for the violet colors is:

| | Per cent by weight |
|---|---|
| $SnO_2$ | 98.1 to 99.4 |
| $Cr_2O_3$ | 0.6 to 1.7 |
| $CuO$ | 0.2 to 1.3 |

The preferred range for the pink colors is:

| | Per cent by weight |
|---|---|
| $SnO_2$ | 40 to 60 |
| $SiO_2$ | 20 to 30 |
| $CaO$ | 20 to 30 |
| $Cr_2O_3$ | 0.5 to 2.0 |
| $CuO$ | 0.5 to 5.0 |

It is to be understood that by the use of different proportions of the three essential materials a whole series of pigments is produced. These vary in color from violet to crimson, some of the colors being more pleasing than others. They are all of some value, however, and I, therefore consider all compositions wherein the strength of color of chrome-tin pigments is enhanced by the use of copper as within the broad scope of my invention.

Having thus described my invention, what I claim is:

1. A ceramic pigment material containing oxides of tin, chromium and copper, chromium and copper oxides together amounting to more than one and less than five per cent of the weight of the tin oxide.

2. Violet pigments comprising:

| | Parts by weight |
|---|---|
| Tin oxide | 98.1 to 99.4 |
| Chromium oxide | 0.6 to 1.7 |
| Copper oxide | 0.2 to 1.3 |

3. A violet pigment comprising:

| | Parts by weight |
|---|---|
| Tin oxide | 98.6 |
| Chromium oxide | 0.75 |
| Copper oxide | 0.65 |

4. Pink pigments comprising:

| | Parts by weight |
|---|---|
| Tin oxide | 40 to 60 |
| Silica | 20 to 30 |
| Calcium oxide | 20 to 30 |
| Chromium oxide | 0.5 to 2.0 |
| Copper oxide | 0.5 to 5.0 |

5. As a new composition of matter, a ceramic pigment material being the calcination product of materials capable of yielding on calcination oxides of tin, chromium and copper, the proportions being such that the oxides of chromium and copper aggregate approximately from 0.8% to 14.9% of the combined weights of the oxides of tin, chromium and copper and the ratio of chromium oxide to copper oxide being from 3.0 to 0.4.

6. Process of making ceramic pigments comprising calcining above 1200° C., a batch comprising a mixture of materials capable of yielding and in proportion to yield on calcination oxides of tin, chromium and copper, the proportions of said materials employed being such as to yield copper and chromium oxides aggregating approximately from 0.8% to 14.9% of the combined yield of tin, chromium and copper oxides and the ratio of chromium oxide to copper oxide being from 3.0 to 0.4.

7. Process of making ceramic pigments comprising calcining above 1200° C. a mixture of materials capable of yielding oxides of tin, chromium and copper, the proportions of said materials being such that the combined yield of oxides of chromium and copper is approximately from one to five per cent of the tin oxide.

WILLIAM D. STILLWELL.